United States Patent
Mulder et al.

(10) Patent No.: US 8,563,056 B2
(45) Date of Patent: Oct. 22, 2013

(54) CONTINUOUS METHOD FOR THE PRODUCTION OF A YEAST FERMENTED BEVERAGE

(75) Inventors: Hendrikus Mulder, Uitgeest (NL); Onno Cornelis Snip, Rijswijk (NL); Douglas John Banks, Auckland (NL); Herman Hendrik Jan Bloeman, Leiden (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 695 days.

(21) Appl. No.: 12/300,776

(22) PCT Filed: May 16, 2007

(86) PCT No.: PCT/NL2007/050218
§ 371 (c)(1),
(2), (4) Date: Apr. 27, 2009

(87) PCT Pub. No.: WO2007/136257
PCT Pub. Date: Nov. 29, 2007

(65) Prior Publication Data
US 2009/0311371 A1    Dec. 17, 2009

(30) Foreign Application Priority Data

| May 19, 2006 | (EP) | 06114246 |
| May 19, 2006 | (EP) | 06114250 |
| May 19, 2006 | (EP) | 06114256 |
| May 19, 2006 | (EP) | 06114261 |
| May 19, 2006 | (EP) | 06114264 |
| May 19, 2006 | (EP) | 06114275 |

(51) Int. Cl.
    *C12C 11/00*    (2006.01)

(52) U.S. Cl.
    USPC .................. 426/16; 426/62; 426/64; 99/276

(58) Field of Classification Search
    USPC ....................... 426/11, 15, 16, 489
    See application file for complete search history.

(56) References Cited

U.S. PATENT DOCUMENTS 3,234,026 A * 2/1966 Coutts ............................ 426/16
4,140,799 A * 2/1979 Nagodawithana et al. ..... 426/11
(Continued)

FOREIGN PATENT DOCUMENTS

| DE | 44 01 694 A1 | 7/1995 |
| WO | WO-92/12231 A1 | 7/1992 |
| WO | WO-95/26395 A1 | 10/1995 |

OTHER PUBLICATIONS

Mizuno et al "Characterization of Low-Acetic-Acid-Producing Yeast Isolated from 2-deoxyglucose-resistant Mutants and Its Application to High-Gravity Brewing" Journal of Bioscience and Bioengineering, vol. 101, No. 1, Jan. 2006.

(Continued)

*Primary Examiner* — Humera Sheikh
*Assistant Examiner* — Subbalakshmi Prakash
(74) *Attorney, Agent, or Firm* — Gilberto M. Villacorta; Sunit Talapatra; Foley & Lardner LLP

(57) ABSTRACT

The invention provides a continuous method for the production of a yeast fermented beverage, comprising consecutive continuous processing steps; wherein the gravity of a mash extract is maintained at more than 22° P; the gravity of the wort produced from the mash extract is maintained at more than 22° P until said wort is diluted with additional water; and the gravity of the diluted wort is within the range of 10-35° P; and wherein less than 30 wt. % of the fermentable sugars in the mash extract and wort are derived from fermentable sugars added after hydrolysis of the starch contained in the mash. The method offers the advantage that it is highly efficient in terms of energy consumption and extraction yields. Furthermore, it achieves extremely high productivity, especially in the operation of the brewhouse.

13 Claims, 2 Drawing Sheets

(56) References Cited

U.S. PATENT DOCUMENTS 4,371,550 A * 2/1983 Nagashima et al. ............ 426/16
4,397,872 A    8/1983 Stubits et al.
4,844,932 A * 7/1989 Daoud ......................... 426/489

OTHER PUBLICATIONS

International Search Report, PCT/NL2007/050218, dated Aug. 30, 2007, 4 pages.

* cited by examiner

US 8,563,056 B2

CONTINUOUS METHOD FOR THE PRODUCTION OF A YEAST FERMENTED BEVERAGE

TECHNICAL FIELD OF THE INVENTION

The present invention relates to a continuous method for the production of a yeast fermented beverage, such as beer. More particularly, the present invention relates to such a continuous method in which a high gravity mash is produced, i.e. a mash with a gravity in excess of 22° Plato.

BACKGROUND OF THE INVENTION

It has been recognised in the beer brewing industry that the production of wort in a continuous operation offers a number of advantages, including:

higher productivity and lower investment: vessels can be operated for prolonged periods of time under full load, meaning that for equal production volume smaller vessels are needed than in a batch process;

constant and better quality: process is easier to control due to possibility of adapting process parameters to local and instantaneous requirements and because steady-state-conditions are much more stable;

high hygienic standard: continuous process is operated in a closed system.

less energy: energy consumption is evenly spread, without major use peaks;

less labour: operation of continuous process requires less attention less standstill and cleaning: continuous process can be operated at much longer runlengths than batch processes.

Many efforts have been made since the end of the 19$^{th}$ century to realise one or more of the above advantages through the development of continuous brewing processes. However, to date across the globe not more than just a couple of breweries have actually introduced continuous brewing operations such as continuous wort production and/or continuous fermentation into their factories.

In the prior art beer brewing processes have been described that comprise the preparation of a high gravity mash extract. U.S. Pat. No. 4,140,799 describes a batch process for the preparation of an alcoholic beverage, comprising the steps of preparing an aqueous fermentable substrate containing fermentable carbohydrates and having a solids content in the range of 18° to 36° Plato. It is stated in the US patent that, in general, the wort is prepared by mashing malt with an adjunct, with the malt comprising from about 35% to 65% by weight of the total extract weight. The US patent teaches to reduce the solids content by dilution as soon as carbohydrate consumption rate during fermentation decreases as signified by foam collapse.

U.S. Pat. No. 4,371,550 describes a batch process for beer brewing which comprises mixing a high-gravity fermenting liquor comprising a fermenting wort of an original gravity of 14-21° P, which has passed through the high krausen period, and a low gravity liquor comprising a fermenting wort or wort of an original gravity of 3-6° P and subjecting the resulting mixture to fermentation to obtain a beer of an original gravity of 6-9° P. The process described in this US patent is said to be particularly suitable for the production of light beer, i.e. beer of low original gravity.

U.S. Pat. No. 4,397,872 describes a batch method of brewing beer wherein wort is produced from a mash consisting essentially of water, malt, and a substantial amount of rice as an adjunct, the improvement comprising using as said rice strains of rice having a gel point of 70° C. or less, and using increased amounts of malt and rice in direct proportions in the mash to obtain a wort having a cold wort concentration of 16° Balling or higher to produce a high gravity beer. In the US patent it is observed that a degree of Balling means a percent solids in the wort.

DE-A 44 01 694 describes a batch process for the preparation of filtered wort that uses recovered filter water to achieve enhanced concentration of the wort. The stated aim is to arrange the separation process with the mash filter in such a way that a final concentration, prior to concentration by evaporation, of more than 19 GG-% is achieved. Furthermore, it is observed in the German patent application that preferably the primary wort concentration is between 23 GG-% and 25 GG-%.

The above prior art publications do not disclose a continuous brewing process comprising the preparation and further processing of a high gravity mash extract into a high gravity wort. Furthermore, the aforementioned publications rely on the addition of high levels of adjuncts after starch hydrolysis (mash heating) to prepare high gravity mash extract.

SUMMARY OF THE INVENTION

The present inventors have realised that significant benefits may be achieved in the production of yeast fermented beverages if such production is carried out in a continuous fashion and if the continuous operation of the brewhouse is carried out at high gravity, i.e a gravity in excess of 22° Plato (° P). Furthermore, the inventors have designed an elegant process that delivers these benefits without requiring the addition of considerable amounts of adjunct after mash heating. Finally, the present method does not have any significant drawbacks.

The present method comprises a number of consecutive continuous processing steps, including:

a. mashing starch-containing and optionally malted raw materials with aqueous liquid;

b. hydrolysing the starch to fermentable sugars;

c. removing spent grain from the heated mash to produce a mash extract, d. converting the mash extract into wort by heating;

e. removing organic volatiles from the hot wort;

f. diluting the wort with additional water;

g. feeding the diluted wort into a propagation vessel to grow the yeast;

h. feeding the wort from the propagation vessel to one or more fermentation vessels to ferment the wort;

i. feeding the fermented wort into one or more separators to remove a yeast-containing residue;

j. recirculating part of the yeast-containing residue to the propagation vessel; and k. feeding the remainder of the fermented wort to subsequent processing steps.

The present process is characterised in that: (i) the gravity of the mash extract is maintained at more than 22° P; (ii) the gravity of the wort is maintained at more than 22° P until said wort is diluted with additional water; and (iii) the gravity of the diluted wort is within the range of 10-35° P; and further in that less than 30 wt. % of the fermentable sugars in the mash extract and wort are derived from fermentable sugars that have been added after hydrolysis of the starch contained in the mash.

The inventors have designed a process that enables the preparation of a high gravity mash extract without employing evaporation or adjuncts. The present method offers the advantage that it is highly efficient in terms of energy consumption and extraction yields. Furthermore, the present method achieves extremely high productivity, especially in the operation of the brewhouse.

DRAWINGS

DETAILED DESCRIPTION OF THE INVENTION

Figure 1:
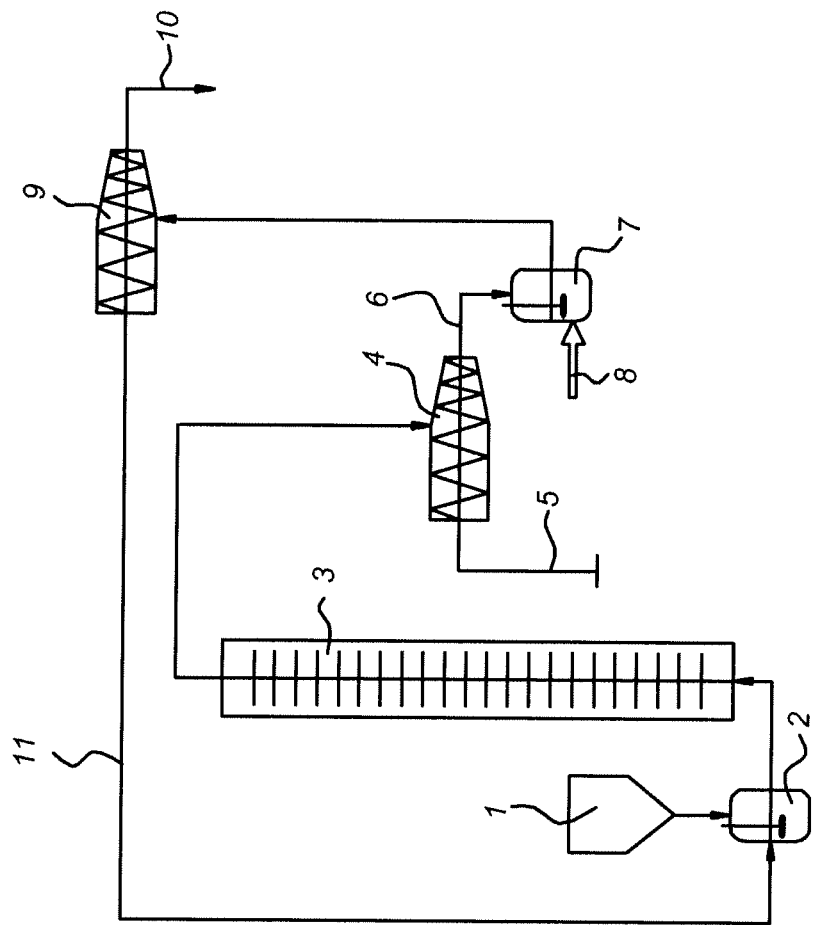
FIG. 1 is a diagram of an apparatus for continuous production of a high gravity mash extract, comprising two separators and one mixing vessel.

Accordingly, the present invention provides a continuous method for the production of a yeast fermented beverage, comprising the following consecutive continuous processing steps:
a. mashing starch-containing and optionally malted raw materials with aqueous liquid;
b. heating the mash and enzymatically hydrolysing the starch to fermentable sugars;
c. removing spent grain from the heated mash to produce a mash extract,
d. converting the mash extract into wort by heating said mash extract to at least 60° C. for at least 15 minutes;
e. removing organic volatiles from the hot wort by reducing pressure and/or by stripping it with a gas or steam;
f. diluting the wort with additional water;
g. feeding the diluted wort into a propagation vessel in which it is combined with a recirculated stream of yeast-containing residue and in which oxygen is supplied to initiate yeast growth;
h. feeding the wort from the propagation vessel into a sequence of one or more fermentation vessels in which the yeast is kept suspended;
i. feeding the fermented wort into one or more separators to remove a yeast-containing residue;
j. recirculating part of the yeast-containing residue to the propagation vessel; and
k. feeding the remainder of the fermented wort to subsequent processing steps;
wherein the gravity of the mash extract is maintained at more than 22° P; the gravity of the wort is maintained at more than 22° P until said wort is diluted with additional water; and the gravity of the diluted wort is within the range of 10-35° P; and wherein less than 30 wt. % of the fermentable sugars in the mash extract and wort are derived from fermentable sugars added after hydrolysis of the starch contained in the mash.

The term "mashing" as used herein refers to the admixing of starch-containing raw material, water and enzymes capable of hydrolysing starch. The latter enzymes may be provided by e.g. malt or by another enzyme source, e.g. a commercially available enzyme preparation containing starch degrading enzymes such as those found in malt, notably α-amylase, β-amylase and/or glucoamylase. Preferably, the enzymes are employed in the present method in the form of malt.

The present process is particularly suitable for producing yeast-fermented malt beverages such as beer, ale, malt liquor, porter and shandy. Preferably, the present process is employed to produce an alcoholic or non-alcoholic beer.

It is known in the brewing industry to produce a fermentable mash extract with high gravity by incorporating a significant amount of adjunct (e.g. syrup), especially after enzymatic hydrolysis of the starch contained in the mash. These adjuncts can be used to provide high concentrations of fermentable sugars and consequently can be used to boost the gravity of the mash extract and wort. In the present method, high gravities can be achieved in the mash extract and wort without addition of fermentable sugars after enzymatic hydrolysis of the starch contained in the mash. Typically, less than 20 wt. %, preferably less than 10 wt. % of fermentable sugars in the mash extract and wort are derived from fermentable sugars added after hydrolysis of the starch contained in the mash. Most preferably, the mash extract and wort contain no fermentable sugars derived from fermentable sugars added after enzymatic hydrolysis of the starch contained in the mash.

It is also known to increase the gravity of mash extracts or wort through evaporation. In the present process, preferably no concentration by means of evaporation is employed. In accordance with a preferred embodiment of the present invention the water content of the mash extract and the wort is not reduced by means of evaporation or said water content is reduced by means of evaporation by not more than 20%, preferably by not more than 10% and even more preferably by not more than 5% prior to the dilution with water. According to an even more preferred embodiment, the water content of the mash extract and the wort is not reduced or it is reduced by not more than 20%, preferably by not more than 10% and most preferably by not more than 5% prior to the dilution with water. Most preferably, in the present process the gravity of the mash extract and wort remains at an essentially constant level until dilution with water. Typically, until said dilution, the gravity of the mash extract and the wort is maintained within the range of 22 to 60° P, preferably within the range of 25-50° P.

According to a preferred embodiment of the present method, the aqueous liquid used in the mashing step is effluent obtained from washing the spent grain. The spent grain obtained after removal of the mash extract contains appreciable levels of fermentable sugars. Hence, in order to minimise extract losses, the spent grain is advantageously washed out with water. By using the aqueous effluent so obtained to produce the mash, it is ensured that extract losses are minimised whilst at the same time a mash extract of high gravity is produced.

In an even more preferred embodiment, the spent grain is removed from the mash by:
transferring the heat-treated mash into a first separator for separation into a stream of fermentable mash extract and spent grain;
transferring the spent grain into a mixing vessel and combining it with sparging water;
transferring the mixture of spent grain and sparging water into a second separator to remove spent grain;
recirculating an aqueous stream from the second separator to the mashing step.

FIG. 1 depicts an apparatus that can suitably be employed for removing spent grain from the mash in the way described above. In the arrangement of the apparatus shown in FIG. 1, ground malt, is continuously fed from hopper 1 into mixing vessel 2, in which the ground malt is thoroughly mixed with the recirculated aqueous stream 11 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to the first separator 4, a decanter. In the first separator, the heat treated mash is separated into mash extract 5 and spent grain 6. The spent grain 6 is continuously transferred into the mixing vessel 7, where it is thoroughly mixed with a continuous supply of sparging water 8. The resulting slurry is transferred to the second separator 9, which is also a decanter. In the second separator 9 the slurry is separated into exhausted spent grain 10 and an aqueous stream 11 which is recirculated to the mixing vessel 2.

A most preferred embodiment of the method as described above, comprises the additional steps of:
- transferring the spent grain obtained from the second separator into a second mixing vessel and mixing it with sparging water;
- transferring the mixture of spent grain and sparging water into a third separator to remove spent grain; and
- recirculating the aqueous stream from the third separator as sparging water to the first mixing vessel.

Figure 2:
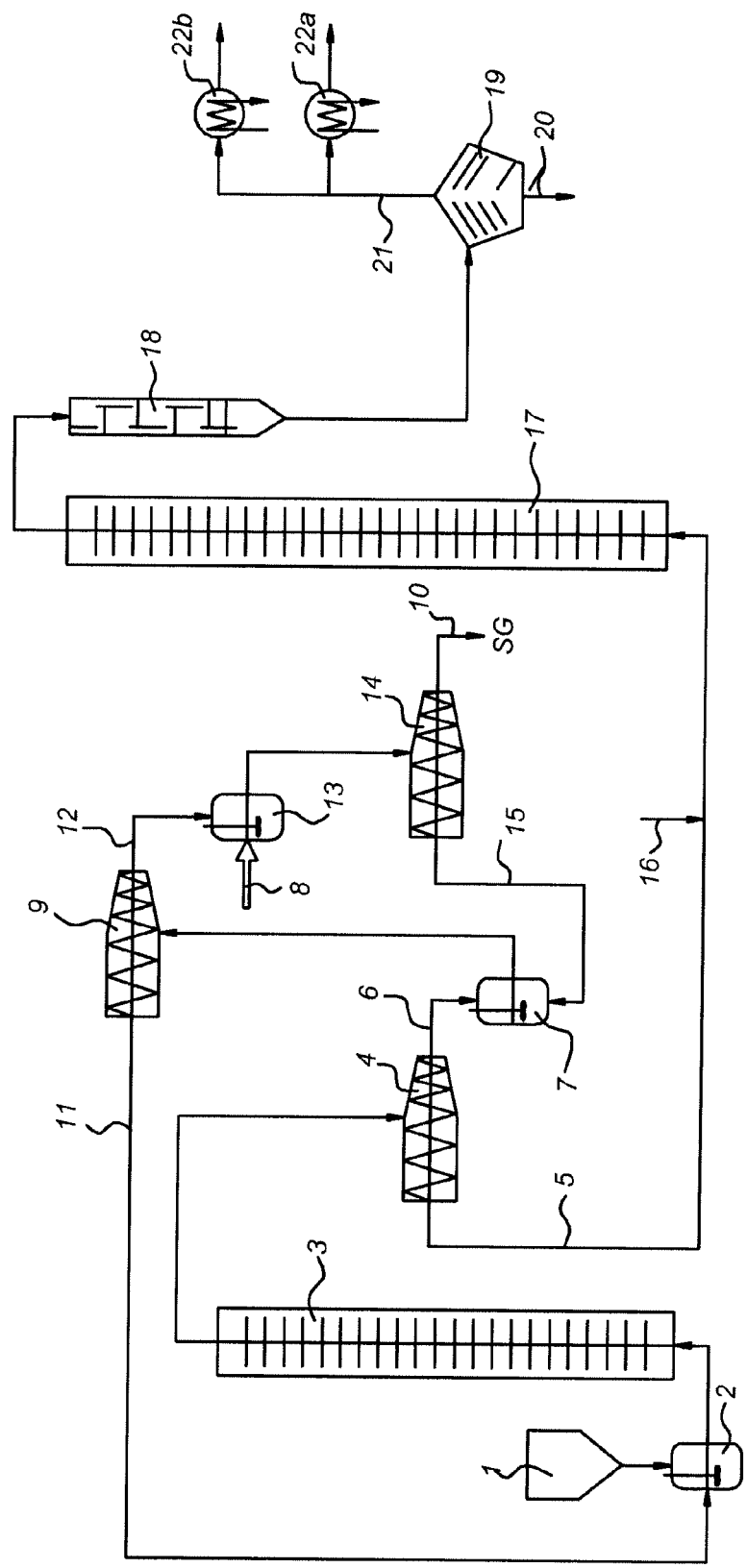
FIG. 2 is a diagram of an apparatus for continuous production of deodorised fermentable wort, wherein a high gravity mash extract is produced, using three separators and two mixing vessels

FIG. 2 depicts an apparatus that can suitably be employed for removing spent grain from the mash in this way. FIG. 2 shows an arrangement of an apparatus for carrying out the method of the present invention in which ground malt is continuously fed from hopper 1 into mixing vessel 2, in which the ground malt is thoroughly mixed with the recirculated aqueous stream 11 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to the first separator 4, a decanter. In the first separator, the heat treated mash is separated into mash extract 5 and spent grain 6. The spent grain 6 is continuously transferred into the mixing vessel 7, where it is thoroughly mixed with an aqueous stream 15. The resulting slurry is continuously transferred to the second separator 9, which is also a decanter. In the second separator 9 the slurry is separated into spent grain 12 and an aqueous stream 11 which is recirculated to the mixing vessel 2. The spent grain 12 is continuously transferred into the mixing vessel 13, where it is thoroughly mixed with a continuous supply of sparging water 8. The resulting slurry is transferred to the third separator 14, which is also a decanter. In the third separator 14 the slurry is separated into exhausted spent grain 10 and an aqueous stream 15 which is recirculated to the mixing vessel 7.

The mash extract 5, after addition of hop extract 16, is continuously introduced into a wort boiler 17 in the form of a plug flow reactor. The hot wort is fed from the wort boiler 17 into wort stripper 18 in which organic volatiles are removed by counter current stripping with steam. The deodorised hot wort leaving the wort stripper 18 is introduced into centrifuge 19 to remove trub 20. The trub-free wort 21 is fed from the centrifuge 19 to two cooling units 22a and 22b in which the wort is cooled down, following which it can be fermented with yeast to produce beer.

The term "separator" as used herein encompasses any device that can suitably be used to separate solids from liquids. Examples of separators that may suitably be used in the present method include: centrifuges, decanters, sedimentors, hydrocyclones, sieves, filters and membranes. Preferably, the separator is selected from the group consisting of centrifuges, decanters, hydrocyclones and sieves.

The reuse of the washing and extraction effluent as described above enables the continuous production of high gravity mashing extract with extract losses that do not exceed 6%. Preferably, the method is operated in such a fashion that extract loss does not exceed 5%, and more preferably, extract loss does not exceed 3%. Most preferably, extract loss does not exceed 3%.

In the present process the mash extract is preferably converted into wort by heating said mash extract to 75-150° C. for 30 minutes up to 4 hours, preferably for 30 minutes up to 2 hours. The mash extract may suitably be converted into wort in a plug flow reactor.

The organic volatiles are removed from the hot wort by reducing pressure and/or by stripping it with a gas or steam. This is preferably done in a counter-current fashion. Most preferably, the organic volatiles are removed by stripping the hot wort with an inert gas or steam in a column equipped with a sieve plate geometry. Typically, the wort is maintained at a temperature of 95-110° C. when the organic volatiles are removed. The removal of the volatiles can suitably be achieved within 10 minutes, preferably it is achieved in within 2 minutes.

After the removal of the volatiles and prior to propagation, the so called hot break is removed in a separator. Examples of suitable separators include centrifuges, decanters, hydrocyclones, sedimenters, sieves and membrane filters. Preferably, the separator is selected from the group consisting of decanters, sedicanters and disc type centrifuges. Most preferably, the separator used is a disc type centrifuge. The separator is typically operated at a centrifugal force of at least a theoretical capacity factor ($\Sigma$) of at least 1,000 m$^2$, preferably of at least 2,500 m$^2$, more preferably of at least 5,000 m$^2$ and even more preferably of at least 10,000 m$^2$ at a flow rate of 1 m$^3$/hr. Higher capacities can be scaled proportionally with the flow rate through the separator and the theoretical capacity factor.

The theoretical capacity factor (SIGMA value) of a centrifuge is calculated on the basis of the method described in "Solid-Liquid Separation", 2$^{nd}$ edition, 1981, by Ladislav Svarovsky, Butterworth-Heineman. The factor is calculated according to the following relation between: the number of discs (n), the gravitational acceleration (g), the angular speed ($\omega$), the angle of the discs with the vertical feed pipe ($\alpha$), the inner radius of the discs package ($r_1$) and the outer radius of the discs package ($r_2$).

$$\Sigma = \frac{\omega^2}{g} \frac{2}{3} \pi n (r_2^3 - r_1^3) \cot \alpha$$

The SIGMA value of a decanter is calculated according to the following relation between: the length of the cylindrical bowl (L), the gravitational acceleration (g), the angular speed ($\omega$), the radius of the dam ring or overflow ring ($r_1$) and the radius of the cylindrical bowl ($r_2$).

$$\Sigma = \frac{\omega^2}{g} \pi L \left( \frac{3}{2} r_2^2 + \frac{1}{2} r_1^2 \right)$$

The wort obtained after removal of organic volatiles is diluted with water, meaning that said wort is combined with an aqueous stream of lower gravity than said wort. It will be understood that water stream may consist, for instance, of tap water or spring water. It is also within the scope of the present invention to employ aqueous effluent that has been obtained from a washing operation within the brewing process. In particular, it may be advantageous to combine the wort with an aqueous stream that is obtained from yeast washing.

After removal of organic volatiles, the wort is diluted with additional water. This is advantageously done by combining the still hot wort with water of a substantially lower temperature. Typically, the wort from which the organic volatiles have been removed has a temperature in excess of 50° C., preferably in excess of 60° C., most preferably in the range of 70-100° C. when it is diluted. In the present method the wort is diluted to a gravity within the range of 10-35° P, preferably of 10-30° P prior to being introduced in the propagation vessel. Fermentation at high gravity, e.g. a gravity in excess of 35° P, is not practical as yeast growth and yeast metabolism are impaired at such high gravities. Typically, the original gravity of the combined streams of diluted wort and yeast-containing residue in the propagation vessel and the one or more fermentation vessels exceeds 15° P. Preferably, said original gravity is within the range of 17-35° P.

Typically, during dilution the gravity of wort is reduced by at least 2 degrees Plato, preferably by at least 4 degrees Plato and most preferably by at least 6 degrees Plato. Fermentation at high gravity, e.g. a gravity in excess of 35° P, is not practical as yeast growth and yeast metabolism are impaired at such high gravities. Dilution of the wort may occur before and/or after trub removal. Preferably, the wort is diluted after trub removal.

The hot wort may suitably be cooled, preferably after trub removal, to a temperature as low as 8° C., in which case no further cooling of the wort is required prior to introduction of the wort in the fermenter. The hot wort obtained after removal of the organic volatiles is suitable cooled by passing said hot wort through a cooling device, e.g. a plate heat exchanger, tubular heat exchangers, self cleaning heat exchangers (e.g. scraped surface heat exchangers and fluidised bed self cleaning heat exchangers).

In order to ensure that yeast growth occurs in the propagation vessel at a desirable high rate, oxygen must be supplied. This may be done by ensuring that the propagation vessel contains a headspace of air that is in open connection with surrounding atmosphere and by vigorously stirring the fermentation broth. Alternatively, oxygen or air may be introduced into the propagation vessel (e.g. by injection it into the yeast-containing wort) or by injecting it into the wort stream or a recirculated stream of yeast containing residue prior to entry into the propagation vessel. In both cases the air or oxygen is advantageously distributed throughout the yeast-containing wort. This may be achieved by stirring, recirculation and/or by introducing the oxygen or air through a plurality of gas injectors. According to a particularly preferred embodiment, oxygen is supplied by introducing it into the wort stream prior to entry into the propagation vessel. This embodiment offers the advantage that the oxygen concentration can be controlled quite accurately. Oxygen is typically introduced in the yeast-containing wort in an amount of at least 8 ppm, preferably in an amount of 10-40 ppm, calculated on the main wort stream.

Typically, the residence time in the propagation vessel is within the range of 0.5-5 hours. The residence time in the propagation vessel can be calculated by dividing the operational volume of the propagation vessel by the wort flow rate to the system. The operational volume of the propagation vessel equals the total volume of liquid that is contained in the vessel.

The recirculation of the yeast-containing residue in combination with oxygen supply make it possible to maintain high yeast concentrations in the propagation vessel Typically, the yeast content of the wort in the propagation vessel is maintained at more than 20 g/liter (based on wet yeast). According to a particularly preferred embodiment, the yeast concentration of the wort in the propagation vessel is within the range of 30-300 g/l (again based on wet yeast). Even more preferably, the yeast concentration of the wort in the propagation vessels is within the range of 50-200 g/l. The amount of wet yeast contained in a suspension equals the amount of yeast cake with a water content of 73% that may be isolated from the suspension by means of centrifugation. The aforementioned water content includes the water contained in the yeast cells. Advantageously, these yeast concentrations are maintained in the one or more fermentation vessels downstream of the propagation vessel. The use of high yeast concentration offers several important advantages, especially in terms of productivity and cost efficiency.

The present process can be operated at high efficiency by recirculating a large fraction of the yeast-containing residue that is removed from the fermentate. According to a preferred embodiment, between 10 and 100%, most preferably between 50 and 100% of the yeast-containing residue that is removed from the fermentate is recirculated to the propagation and/or fermentation vessels.

Typically, at least 20%, especially at least 40% of the yeast present in the fermented liquid is recirculated to the fermentation. Preferably at least 60% and most preferably at least 75% of the yeast present in the fermentate is recirculated. Usually not more than 98% of the yeast present in the fermentate is recirculated.

Typically, at least 20%, especially at least 40% of the yeast present in the fermented wort is removed from the fermented wort before it is subjected to clarification or, if it is not clarified, before it is filled. Preferably, at least 60%, more preferably at least 80%, even more preferably at least 90% and most preferably at least 95% of the yeast present in the fermented wort is removed. Preferably, the yeast is removed by means of sedimentation.

The temperature of the liquid within the propagation vessel is suitably maintained within the range of 5-40° C., preferably within the range of 6-25° C., more preferably within the range of 8-18° C. The propagation vessel may be operated under super-atmospheric pressure, especially if pressurised air or oxygen is introduced into the vessel. Preferably, the propagation vessel is operated at approximately atmospheric pressure.

In order to maximise efficiency, it should be ensured that the part of the yeast-containing residue that is not recirculated to the propagation vessel has been largely exhausted in that virtually all (green) beer has been removed therefrom. This may advantageously be achieved by washing the fermented liquid and/or by washing the non-recirculated yeast-containing residue.

The present method uses one or more fermentation vessels in which the yeast is kept suspended. Preferably, said yeast is not immobilised onto a carrier. The yeast is suitably kept suspended in the fermentation vessels by means of stirring, recirculation and/or carbon dioxide evolution.

Typically, the combined residence time in the one or more fermentation vessels is within the range of 5-80 hours. The combined residence time in the one or more fermentation vessels can be calculated by adding up the residence times within each of the fermentation vessels. The residence time within a fermentation vessel is calculated by dividing the total operational volume of the fermentation vessel by the wort flow rate to the fermentation vessels.

The temperature of the fermenting wort within the one or more fermentation vessels is suitably maintained within the range of 5-40° C., preferably within the range of 6-25° C., more preferably within the range of 8-18° C. According to a particularly preferred embodiment, the present method employs at least two fermentation vessels. The use of two or more fermentation vessels offers the advantage that higher substrate conversion rates can be achieved in the vessels preceding the last fermentation vessel. Typically, a sequence of not more than 4 fermentation vessels is employed. Most preferably, the present method employs a sequence of 2 or 3 fermentation vessels.

In the present method, the combined residence time in the propagation vessel and the one or more fermentation vessels typically does not exceed 80 hours. According to a preferred embodiment, said combined residence time does not exceed 40 hours. Most preferably, the combined residence time is within the range of 5-30 hours. These relatively short residence times may suitably be achieved by employing relatively high yeast concentrations as described herein before.

Following removal of yeast-containing residue from the fermented wort the green beer so obtained can be subjected to further processing. In the case of production of beer, the further processing preferably includes maturation, cold storage, filtration, carbonation and filling. Preferably, maturation, carbonation and filling are also done in a continuous fashion.

Typically, the present method employs a maturation step following the removal of yeast cells from the fermentate. After fermentation, many undesirable flavours and aromas are present in the "green" or immature beer. Maturation (also sometimes referred to as ripening) reduces the levels of these undesirable compounds to produce a more palatable product. Preferably, the maturation step occurs in the present process prior to filtration, more preferably, prior to cold storage. Advantageously, maturation is achieved in the present method in a continuous fashion by feeding unmatured beer in the upper part of a vessel. The beer moves downwards and the yeast settles through the beer volume. The yeast is collected in the bottom of the vessel and above the yeast level, the matured beer is removed and fed into cold storage vessels. The beer remains at a cold temperature for a certain period to allow for coagulation and stabilisation of colloidal particles.

Maturation may also be achieved in a batch process by maturing the immature beer in a maturation vessel or in a fermenter. Following maturation, yeast is preferably removed. Next, the beer is transferred to cold storage tanks for stabilisation or it is cooled in the fermenter or maturation vessel.

Cold storage typically involves maintaining the fermentate at a temperature of less than 10° C., preferably of less than 5° C., more preferably of less than 2° C. for at least 12 hours, preferably for at least 24 hours. According to a preferred embodiments cold storage is applied after maturation and before filtration.

According to a particularly advantageous embodiment of the method as defined herein before, said method is operated in a fully continuous fashion.

The invention is further illustrated by means of the following

EXAMPLES

Example 1

In a production run, a stream of 1.0 m$^3$/hr wort with an extract concentration of 24.51° P is produced after mash separation. This stream is subsequently diluted after the boiling process resulting in a final wort stream of 1.4 m$^3$/hr of wort with an extract concentration of 18° P. This wort is fermented and matured in continuous fermentors and finally stabilised in batch vessels. The beer is subsequently continuously centrifuged and filtered. A detailed description of the production run is provided below.

At the front of the process, a recirculated aqueous stream of approximately 920 l/hr having a temperature of 55° C. is continuously mixed with a stream of 332 kg/hr hammer milled malt grist (screen size 1.5 mm). Both streams are fed into a continuous stirred tank reactor of 70 liter working volume at a temperature of 55° C. The residence time of this treatment is 4 minutes and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231).

At certain heights in the first column, the mash is heated by direct steam injection and the total reactor is insulated to minimise heat losses. The temperature profile is chosen such that the conversion of malt starch to fermentable sugars is appropriate for the product desired. The applied temperature profile in this example involves a protein rest at 55° C., followed by a saccharification rest at 67° C., and a mashing-off temperature of 78° C. The mash has a total residence time inside the reactors of 55 minutes and the resulting mash is fed into the mash separation section.

Separation of the malt husks and other solids from the mash is done by two decanters. These decanters are scroll type bowl centrifuges with a continuous discharge of clarified liquid and thickened spent grains. The first decanter operates at a rotational speed of 4000 rpm and a differential screw speed of 4 rpm. This decanter has a theoretical capacity factor value of 2275 m$^2$. The product (mash extract) is discharged from the first decanter to the next unit operation (boiling) at a mass flow rate of 1000 kg/hr and contains an extract concentration of 24.5° P. Spent grains with a dry matter content of about 24-25% are released from the first decanter into a small continuous stirred tank reactor. In the latter, 940 l/hr washing water of 80° C. is introduced and, with a residence time of 8 minutes, spent grains particles and water are homogeneously mixed.

The liquid phase of the resulting mixture is separated by a second decanter operating at 2 rpm differential screw speed, 4000 rpm, and theoretical capacity factor of 1800 m$^2$. The clarified liquid supernatant is recirculated to the aforementioned mashing-in vessel and the spent grains are discharged with a dry matter content of 28-30%. Both decanters are equipped with a centrifugal fan and consequently work as a pump on the supernatant outlet.

The product from the mash separation is now referred to as wort and has a flow rate of 1 m$^3$/hr. Hop extract is dosed continuously in-line at a rate of 140 g/hr and the mixture is heated to a temperature of 102° C. by direct steam injection. By the positive head of the first decanter, the wort is pumped into a plug flow reactor. This column reactor has the same characteristics as the earlier described mashing conversion column. The volume of this reactor is 1 m$^3$ and the typical residence time is 60 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 15 kg/hr and at atmospheric conditions at the top of the stripper.

The wort leaving the bottom of the stripper is fed into a small buffer with negligible dimensions and mixed with a stream of hot water at 80° C. to achieve the final gravity of 17.9±0.1° P. This diluted product is fed into a centrifuge of the discontinuous discharge type. This machine has a rotational speed of 7400 rpm and a theoretical capacity factor of 13000 m².

Extract losses observed during this wort production process are limited to 2.0-3.5% on the decanters and 1.0-2.0% on the separator, yielding an overall extract loss of 3.0-5.5%.

Next, cooling of the wort takes place in two parallel plate and frame wort coolers that lower the wort temperature from 95-100° C. to 8° C. by a two stage water-glycol set-up.

The cooled wort is fed into the first stirred continuous fermentation vessel with a net working volume of 3.1 m³. This vessel is operated under aerobic conditions by the continuous addition of an aerated recirculated stream from the downstream end of the process, containing thickened yeast as the main constituent besides water. The apparent gravity in this vessel is about 12° P. The yeast necessary for the fermentation is added in the form of the abovementioned recirculated stream.

The fermentation broth from the first fermentation vessel is transferred to the second vessel. This vessel has a working volume of 39 m³ and is kept at a temperature of 12° C. by wall cooling. The apparent gravity in this vessel is 7° P and the yeast concentration is 80 g wet yeast/l. The outlet of this vessel is split into two streams: one part (0.7 m³/hr) is combined with another stream from the end of the process and recirculated to the first fermentation vessel, whereas the other part (1.7 m³/hr) is fed into a third fermentation vessel.

This third vessel has a working volume of 38 m³ and the contents have an apparent gravity of 3° P. The product of this vessel is transferred to a yeast sedimentation vessel with a working volume of 2 m³. The yeast sedimentation vessel separates the main part of the yeast (90-95%) from the green beer. The compacted yeast in the bottom of the yeast sedimentation vessel has a yeast concentration of 200 g wet yeast/l. This stream is partly recirculated to the front of the fermentation process and partly sent to waste surplus yeast storage. The part of the yeast sent to surplus is controlled on the basis of the amount that is leaving the top of the yeast sedimentation vessel and the amount of yeast grown in the fermentation vessels. Green beer from the top of the yeast sedimentation vessel is continuously fed into a continuous maturation vessel.

In this continuous maturation process, the green beer is continuously fed in the top of a 140 m³ vessel via a spray ball that distributes the beer over the surface area of the tank. The temperature is raised to 15° C. by heat exchange in the pipe towards the maturation. This temperature favours conversion of alpha-acetolactate (a metabolic fermentation product) to diacetyl. Due to the presence of yeast in this phase, the yeast can take up the diacetyl and convert it to acetoin or subsequent metabolites. The negative impact of diacetyl in the beer is therewith removed and residual diacetyl levels are typically <30 ppb. The yeast settles at the conical bottom of the maturation tank and is removed and treated as rest beer. The matured beer is removed from just above the settled yeast cone and is transferred via a continuous heat exchanger towards batch cold storage tanks at a temperature of −1.5° C. In the cold storage tanks, the beer is typically stored for several days in batch vessels. After this period, the beer is filtered over kieselguhr. After this filtration, the beer is stabilised with the usual dosings of PVPP and the necessary PVPP filtration. Finally, the beer is packaged in any suitable container (bottle, keg, can).

The invention claimed is:

1. A method for the production of a yeast fermented beverage, comprising the following consecutive continuous processing steps:
   a. mashing starch-containing and optionally malted raw materials with aqueous liquid;
   b. heating the mash and enzymatically hydrolyzing the starch to fermentable sugars;
   c. removing spent grain from the heated mash to produce a mash extract having a gravity of more than 22° P;
   d. converting the mash extract into wort by heating said mash extract having a gravity of more than 22° P to at least 75° C. for at least 15 minutes;
   e. removing organic volatiles from the wort by reducing pressure and/or by stripping the wort with a gas or steam;
   f. diluting the wort with additional water to a gravity of 10-35° P;
   g. feeding the diluted wort into a propagation vessel in which it is combined with a recirculated stream of yeast-containing residue and in which oxygen is supplied to initiate yeast growth;
   h. feeding the wort from the propagation vessel into a sequence of one or more fermentation vessels in which the yeast is kept suspended to produce a fermented wort;
   i. feeding the fermented wort into one or more separators to remove a yeast-containing residue;
   j. recirculating part of the yeast-containing residue to the propagation vessel; and
   k. feeding the remainder of the fermented wort to optional subsequent processing steps;
   wherein the gravity of the mash extract is maintained at more than 22° P; the gravity of the wort is maintained at more than 22° P until said wort is diluted with additional water; and the gravity of the diluted wort is within the range of 10-35° P; wherein less than 20 wt. % of the fermentable sugars in the mash extract and wort are derived from fermentable sugars added after hydrolysis of the starch contained in the mash; and wherein the water content of the mash extract and the wort is not reduced by means of evaporation or wherein said water content is reduced by evaporation by not more than 10%.

2. The method according to claim 1, wherein less than 10 wt. % of the fermentable sugars in the mash extract and wort are derived from fermentable sugars added after hydrolysis of the starch contained in the mash.

3. The method according to claim 1, wherein the spent grain is removed from the mash by:
   (i) transferring the heat-treated mash into a first separator for separation into a stream of fermentable mash extract and spent grain;
   (ii) transferring the spent grain into a first mixing vessel and combining it with sparging water;
   (iii) transferring the mixture of spent grain and sparging water into a second separator to remove spent grain;
   (iv) recirculating an aqueous stream from the second separator to the mashing step.

4. The method according to claim 3, comprising:
   (i) transferring the spent grain obtained from the second separator into a second mixing vessel and mixing it with sparging water;
   (ii) transferring the mixture of spent grain and sparging water into a third separator to remove spent grain; and
   (iii) recirculating the aqueous stream from the third separator as sparging water to the first mixing vessel.

5. The method according to claim 1, wherein the method achieves an overall extract loss that does not exceed 6%.

6. The method according to claim 5, wherein the method achieves an overall extract loss that does not exceed 5%.

7. The method according to claim 6 wherein the method achieves an overall extract loss that does not exceed 4%.

8. The method according to claim 7, wherein the method achieves an overall extract loss that does not exceed 3%.

9. The method according to claim 1, further comprising a step of washing non-recirculated yeast-containing residue with water and wherein the additional water for dilution originates from the non-recirculated yeast-containing residue washing.

10. The method according to claim 1, wherein the combination of diluted wort and yeast-containing residue of step (g) has a gravity that exceeds 10° P.

11. The method according to claim 1, wherein the yeast content of the wort in the propagation vessel is maintained at more than 20 g/liter.

12. The method according to claim 1, wherein the yeast is kept suspended in the fermentation vessels by means of stirring, recirculation and/or carbon dioxide evolution.

13. The method according to claim 1, wherein the wort has a residence time in the propagation vessel and the one or more fermentation vessels that does not exceed 80 hours.

* * * * *

UNITED STATES PATENT AND TRADEMARK OFFICE
CERTIFICATE OF CORRECTION

| | | |
|---|---|---|
| PATENT NO. | : 8,563,056 B2 | Page 1 of 1 |
| APPLICATION NO. | : 12/300776 | |
| DATED | : October 22, 2013 | |
| INVENTOR(S) | : Hendrikus Mulder et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this
Twenty-first Day of July, 2015

Michelle K. Lee
*Director of the United States Patent and Trademark Office*